United States Patent

[11] 3,626,025

| [72] | Inventors | Harry D. Anspon<br>Pittsburgh, Pa.;<br>Richard L. Alexander, Greensburg, Ind. |
|---|---|---|
| [21] | Appl. No. | 723,047 |
| [22] | Filed | Apr. 22, 1968 |
| [45] | Patented | Dec. 7, 1971 |
| [73] | Assignee | Gulf Oil Corporation<br>Pittsburgh, Pa.<br>Continuation of application Ser. No.<br>443,045, Mar. 26, 1965, now Patent No.<br>3,427,296. This application Apr. 22, 1968,<br>Ser. No. 723,047 |

[54] COMPATIBLE POLYMERS
2 Claims, 1 Drawing Fig.

[52] U.S. Cl. .................................................. 260/857,
260/28.5, 260/37, 260/80.72, 260/88.1
[51] Int. Cl. .................................................. C08g 41/04,
C08f 15/02

[50] Field of Search .................................................. 260/88.1,
80.72, 895, 28.5, 28.5 A, 857

[56] References Cited
UNITED STATES PATENTS

| 3,136,735 | 6/1964 | Stott ............................. | 260/857 |
|---|---|---|---|
| 3,256,364 | 6/1966 | Bryant et al. .................. | 260/88.1 |
| 3,211,807 | 10/1965 | Gillies et al. ................... | 260/857 |

FOREIGN PATENTS

| 636,450 | 2/1962 | Canada ......................... | 260/857 |
|---|---|---|---|
| 1,392,354 | 2/1965 | France | |

*Primary Examiner*—Morris Liebman
*Assistant Examiner*—Samuel L. Fox
*Attorneys*—Richard L. Kelly, Forrest D. Stine, Carl A. Cline and Richard A. Anderson

ABSTRACT: Blended polymer compositions containing random interpolymers of ethylene and 1-vinyl-2-pyrrolidinone.

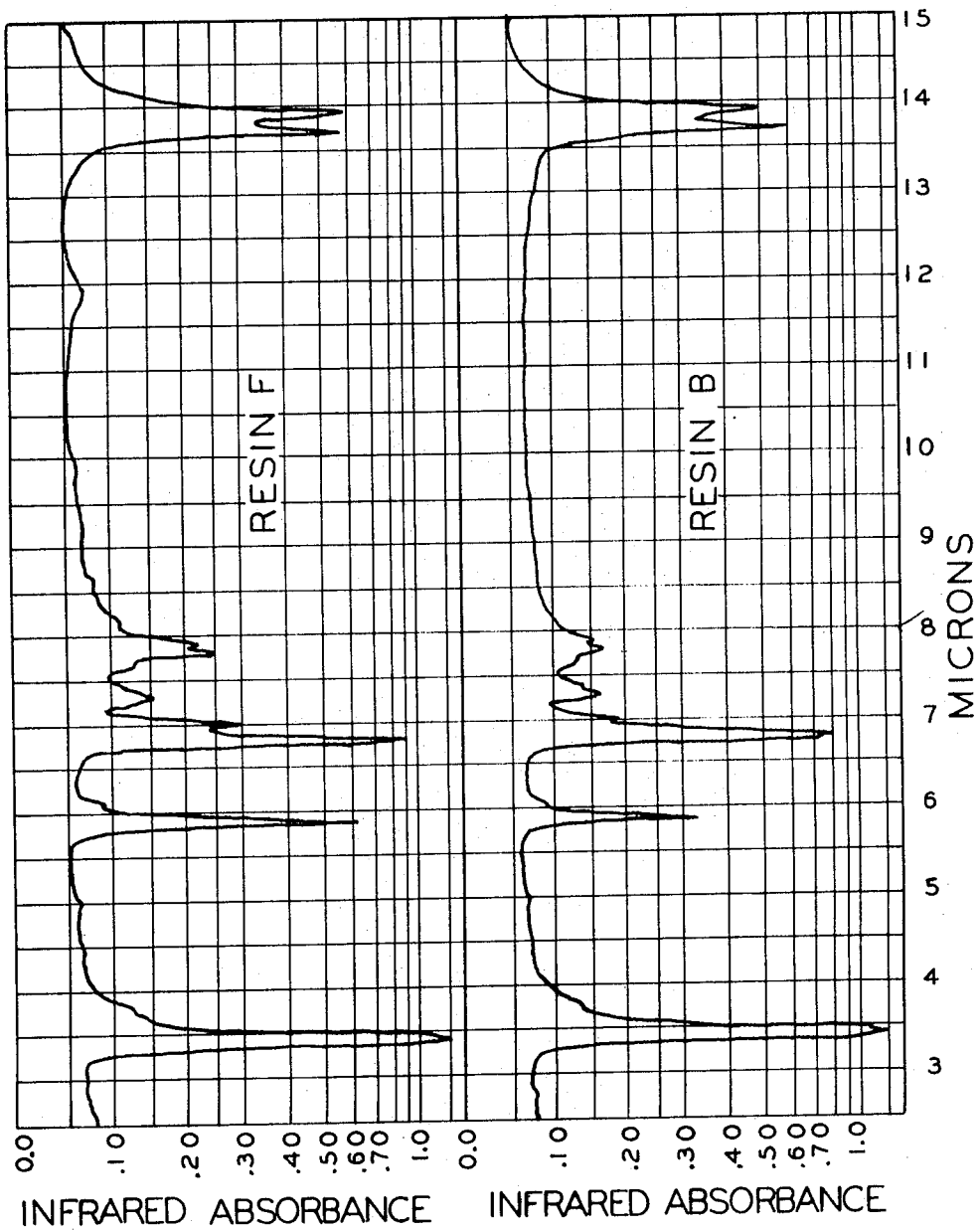

COMPATIBLE POLYMERS

CROSS-REFERENCE TO RELATED APPLICATION

This is a continuation of application Ser. No. 443,045, filed Mar. 26, 1965, by Harry D. Anspon and Richard L. Alexander now U.S. Pat. No. 3,427,296.

This invention relates to novel interpolymers of ethylene and to compositions of such interpolymers with polyethylene, which interpolymers and compositions have extraordinary compatibility with a variety of thermoplastics and other substances. In a further aspect the invention concerns methods of improving the dye and ink receptivity of polyethylene and, in a particular aspect, relates to novel dyed articles. Further, the interpolymers are readily dispersed in water and also can be complexed with iodine to yield bacteriostatic compositions.

The art has long sought a workable and practical method of improving the dyeability of polyolefin resins, especially polyethylene. Heretofore, because of the smooth, nonporous and substantially chemically inert surfaces presented by such polyolefins, it has not been feasible to produce colored polyolefin articles by dyeing.

In the past it has been proposed to incorporate various additives into the polyolefin resins or to employ certain chemical or physical surface treatments to improve their printability. However, no practical commercial technique has been developed to improve the dye affinity of polyethylene through chemical means. The known methods for chemical modification of polyolefin surfaces have not been commercially practical for improvement of dyeability as they introduce various subsidiary problems such as toxicity, which is especially undesirable in films used for food wrapping, etc., depreciation of the optical properties of the resins and serious manufacturing hazards. (For example, it is suggested that the dyeability of polypropylene can be improved by treating the surface of the resin with phosgene (U.S. Pat. No. 3,116,966).)

It is known to incorporate polyvinylpyrrolidone, "PVP" into acrylonitrile resins to improve the dyeability of the resins. However, this technique is not feasible in improving the dyeability of polyethylene since the PVP resins are only compatible at high temperatures and have extremely poor heat stability, resulting in undesirable discoloration of the base resin during compounding. Also, the PVP additive apparently does not yield homogeneous mixtures with polyethylene base resins on cooling, resulting in uneven, mottled dyeing of the product.

It is also known to graft copolymerize N-vinylpyrrolidone upon the surface of shaped polyolefin articles, for example, see *SPE Journal*, 14, p. 40–42 (1958) and U.S. Pat. Nos. 3,049,507 and 3,073,667. However, such techniques involve a number of additional steps which are troublesome, expensive, and complicated. Moreover, the grafts degrade the surface optical properties of the resins. These methods are only applicable to nontransparent articles which have already been fabricated into their final shape, and therefore have very limited utility.

It has recently been suggested (U.S. Pat. No. 3,115,478) to blend stereoregular polyvinylpyridine with polyolefins to improve dyeability. However, such compositions require inordinately long dyeing times, for example, in the range from 1 hour to 1½ hours at elevated temperatures upwards of 90°–100° C. to obtain even dyeings of satisfactory fastness properties.

We have now discovered novel interpolymers of ethylene with 1-vinyl-2-pyrrolidinone. These novel interpolymers are water insoluble, normally solid, random interpolymers of monomers comprising ethylene and from 0.1 to 6.0 mol percent of 1-vinyl-2-pyrrolidinone.

The term "interpolymer" as used herein means a resin having the 1-vinyl-2-pyrrolidinone monomer units interspersed randomly in the main polymer chain between the polymerized units of the comonomers. For example, the ethylene-1-vinyl-2-pyrrolidinone interpolymer may be represented as consisting principally of polymer chains having the following general formula,

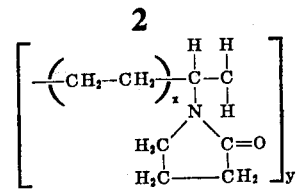

in which x and y are variable whole numbers.

The novel copolymers of the invention can also comprise interpolymers of ethylene and 1-vinyl-2-pyrrolidinone which are terpolymers of ethylene and 1-vinyl-2-pyrrolidinone and a third monomer such as vinyl acetate or polymerizable alkyl esters, e.g. methyl, ethyl, methoxyethyl, dimethylaminoethyl, hydroxyethyl and tert.-butyl esters of acrylic or methacrylic acid. In the case of such terpolymers, the third preferred monomers employed in addition to the ethylene and 1-vinyl-2-pyrrolidinone monomers are methyl acrylate, methyl methacrylate, and vinyl acetate.

The novel interpolymers described above have a marked and unusual affinity for dyes and printing inks and may be dyed or printed by any of a variety of techniques. The novel interpolymers can be used alone as the sole component of the resin to be dyed or they may be blended with conventional polyolefin resins to form substantially homogeneous mixtures which can thereafter by dyed or printed. In still another technique the novel interpolymer is first dyed and thereafter the dyed interpolymer is mixed with conventional polyolefin resins to produce uniformly colored compositions. The novel interpolymers are easily blended with a variety of polyolefins and other thermoplastic resins by ordinary techniques such as compounding in a Banbury mixer or simply by melt extruding or molding a dry mix of discrete solid particles of thermoplastic resin and the interpolymer, either dyed or undyed. The ability of the interpolymers to form substantially homogeneous blends of thermoplastic substances is extraordinary. The interpolymers appear to have solventlike affinity for, and compatibility with a great variety of substances, especially when the interpolymers are in molten condition. This property can be utilized to advantage in blending together thermoplastics which are normally incompatible. For example, polyethylene can be blended with nylon by incorporating in the mixture a substantial quantity of an interpolymer of ethylene with 1-vinyl-2-pyrrolidinone. By using these novel interpolymers as blending aids, it is possible to produce polymer compositions with very desirable combinations of stiffness, impact resistance, tensile strength, surface coefficient of friction, and other properties.

The novel interpolymers hereabove described are water insoluble, resinous, normally solid thermoplastic materials having densities in the range of from about 0.919 to 0.974, inherent viscosities (measured in decalin at 130° C.) of from about 0.30 to about 1.13, vicat softening temperature in the range of from about 33° to 105° C. and crystallinities in the range of from about 8 to about 90 percent as determined by differential thermal analysis. The aforesaid ranges of properties are descriptive of novel interpolymers of ethylene having interpolymerized therein from about 0.1 to about 6.0 mol percent 1-vinyl-2-pyrrolidinone. We have found that the preferred 1-vinyl-2-pyrrolidinone content of the interpolymer for general utility lies within the range of 0.2 to 2.0 mol percent since interpolymers containing less than about 0.2 mole percent 1-vinyl-2-pyrrolidinone do not appear to have exceptionally attractive compatibility characteristics and interpolymers containing in excess of about 2.0 mol percent 1-vinyl-2-pyrrolidinone may contain substantial amounts of vinyl-pyrrolidinone monomer absorbed or dissolved in the polymer, which cause a noticeable odor. The tendency of the polymers containing higher percentages of 1-vinyl-2-pyrrolidinone to absorb or dissolve monomer is consistent with their extraordinary affinity for a large variety of organic substances, such as dyes, solvents, inks, waxes and both natural and synthetic resins.

A. SYNTHESIS OF INTERPOLYMERS

The novel interpolymers are produced by techniques generally similar to those employed in the so-called "high-pressure" ethylene polymerization process with certain critical exceptions. We have found that the reactivity of 1-vinyl-2-pyrrolidinone closely approaches that of ethylene in the polymerization system.

In a typical continuous process for preparing the novel interpolymers, a feed stream of ethylene and N-vinyl-2-pyrrolidinone previously dissolved in 10 percent methanol or other suitable solvent-diluent is contacted in a polymerization zone with a free-radical generating polymerization initiator at a polymerizing pressure generally above 10,000 p.s.i.g., and typically above 14,000 p.s.i.g., and at a polymerization initiation temperature (hereinafter defined) generally above 200° F. and typically above 250° F. The polymerization mixture comprising the novel interpolymer and unpolymerized monomers is continuously withdrawn from the polymerization zone at a rate substantially equal to the monomer feed rates and the interpolymer product is recovered and unreacted monomers are recycled to the polymerization zone. In preparing the novel interpolymers the method of stabilizing the 1-vinyl-2-pyrrolidinone monomer against premature polymerization is critical. In the past, it has been standard practice to employ small amounts of sodium hydroxide admixed with the monomer to prevent prepolymerization. However, in accordance with our invention we have found that the presence of such a stabilizing material in the polymerization zone leads to a product which has an intolerable degree of discoloration. Instead, we employ as a stabilizing agent for the N-vinyl-2-pyrrolidinone monomer a strong nitrogen base, such as ammonia, in amounts of at least 1.0 and preferably about 10 to 100 parts by weight per million parts by weight of 1-vinyl-2-pyrrolidinone monomer. This permits one to obtain a substantially colorless interpolymer product.

Furthermore, when the interpolymer product is to be used as the sole or major resin component of a thermoplastic composition, particularly where such compositions are to be used in the fabrication of films, we have found that it is critical from a standpoint of strength and optical properties to employ polymerization pressures in the range from 18,000 p.s.i.g. to 28,000 p.s.i.g. and polymerization initiation temperatures of from 280° F. to 350° F. It will be understood, however, that such pressures and temperatures need not be employed to produce the interpolymers for use as minor blend components with polyethylene base resins or where the interpolymer is to be used alone in the fabrication of articles having thicker cross sections than films.

Also, when the interpolymer is to be used as the sole resin component of a dyeable film grade composition, we have found that it is advantageous in terms of the optical and strength properties of the films produced from such compositions to employ a free radical generating polymerization initiator having a relatively short half-life, e.g. from about 5 to about 50 minutes and desirably from about 20 to about 40 minutes at 185° F. as determined by the method of Doehnert and Mageli, *Modern Plastics* 36, 142 (Feb. 1959). For example, table I lists several of the initiators which are preferred in the practice of our invention.

TABLE I

| Initiator | Half-life at 185° F. |
| --- | --- |
| Lauroyl Peroxide | 30 minutes |
| Decanoyl Peroxide | 30 minutes |
| Caprylyl Peroxide | 30 minutes |
| Tertiarybutylperoxypivalate | 25–30 minutes |
| α,α'-azobisisobutryonitrile | 40 minutes |

The initiators are introduced into the polymerization zone in a conventional manner, for example, by dissolving the initiator in a suitable solvent and injecting the initiator solution directly into the polymerization zone.

Since the interpolymerization reaction is exothermic a temperature gradient will ordinarily exist within the polymerization zone with generally lower temperatures prevailing at a point of initial contact between the ethylene-1-vinyl-2-pyrrolidinone feed stream and the polymerization initiator and with generally higher temperatures prevailing downstream from that point. After a short induction time the polymerization of the ethylene-1-vinyl-2-pyrrolidinone feed begins and the bulk of the chain propagation and chain growth occurs within a relatively well-defined portion of the polymerization zone which for convenience will be termed herein as the "high molecular weight zone" as any chains initiated within this zone are likely to become high molecular weight molecules. The lowest temperature within the high molecular weight zone is defined herein as the "initiation temperature."

Normally the interpolymer formed by the described procedure will contain a slightly greater proportion of 1-vinyl-2-pyrrolidinone than is present in the feed stream. For example, a feed stream containing about 0.75 percent by weight 1-vinyl-2-pyrrolidinone will yield an interpolymer containing about 1.0 percent by weight of the comonomer and a stream containing about 3 percent by weight yields a polymer containing about 4 percent by weight.

The same process techniques described hereabove in connection with the preparation of an 1-vinyl-2-pyrrolidinone-ethylene interpolymer are also applicable generally to the preparation of the novel interpolymers which are terpolymers of ethylene, 1-vinyl-2-pyrrolidinone and one of the third monomers described hereabove.

EXAMPLE I

This example illustrates the preparation of typical ethylene-N-vinyl pyrrolidinone interpolymers.

An ethylene-N-vinyl-2-pyrrolininone feed stream is continuously introduced at a temperature of about 100° F. through a feed inlet into the top of a stirred autoclave-type polymerization reactor. The 1-vinyl-2-pyrrolidinone monomer in the feed stream is distilled 1-vinyl-2-pyrrolidinone stabilized against premature polymerization with 50 p.p.m. ammonia and dissolved in 10 percent methanol to prevent freezing of the 1-vinyl-2-pyrrolidinone when the pressure is increased. The polymerization initiator is continuously introduced to the reactor and mixed with the feed stream at a point adjacent to the feed stream inlet.

A thermocouple positioned at the confluence of the feed and initiator streams measures the "initiation temperature" (hereinbefore defined). The initiation temperature is controlled by regulating the ratio of initiator to feed. The polymerization mixture comprising ethylene-1-vinyl-2-pyrrolidinone interpolymer, unreacted ethylene and unreacted vinylpyrrolidinone is withdrawn from the bottom of the reactor through a "letdown" valve at a rate substantially equal to the feed rate. The pressure within the reactor is controlled by regulating the pressure drop across the letdown valve. The interpolymer is separated and recovered from the polymerization mixture and unpolymerized ethylene and N-vinyl-2-pyrrolidinone are recycled to the feed inlet.

Table II sets forth the polymerization conditions for the preparation of the various interpolymers and terpolymers and the properties of the interpolymers and terpolymers so prepared.

TABLE II
Interpolymers

| Resin | Temp., °F. | Reaction pressure, p.s.i.g. | Initiating Catalyst | Wt. percent (NVP)(VA) in feed | Wt. percent (NVP)(VA) in product | Polymer viscosity [1] | Polymer density [2] | Softening point (Vicat °C.) | Degree of branching [3] | |
|---|---|---|---|---|---|---|---|---|---|---|
| | | | | | | | | | CH3/ 1,000 C atoms | Pyrrolidone branches/ 1,000 C atoms |
| A | 325 | 14,400 | Decanoyl peroxide | 0.70 NVP | 0.7 NVP (0.18 mol percent) | 1.00 | .9291 | 103 | 16.33 | 0.88 |
| B* | 310-485 | 17,300 | do | 2.06 NVP | 2.63 NVP (0.67 mol percent) | 0.82 | .9261 | 91.5 | 22.14 | 3.32 |
| C | 306 | 21,000 | do | 2.96 NVP | 3.75 NVP | 1.13 | .9388 | 102 | | |
| D | 480 | 14,500 | Tertiary butyl perbenzoate | 2.93 NVP | 4.80 NVP (1.26 mol percent) | 0.41 | .9192 | 33 | 46.92 | 6.35 |
| E | 350 | 15,800 | Decanoyl peroxide | 3.00 NVP | 4.20 NVP (1.09 mol percent) | 0.77 | .9342 | 88 | 17.26 | 5.52 |
| F | 300 | 23,200 | do | 3.92 NVP | 5.30 NVP (1.39 mol percent) | 0.93 | .9379 | 100.5 | | |
| G | 325 | 24,000 | do | 4.67 NVP | 8.50 NVP (2.29 mol percent) | 0.68 | .9466 | 84.0 | 15.40 | 11.70 |
| H | 325 | 19,000 | do | 11.40 NVP | 16.90 NVP (4.93 mol percent) | 0.29 | .9706 | 36.5 | 16.10 | 25.99 |
| Terpolymers (with vinyl acetate) | | | | | | | | | | |
| I | 480 | 14,500 | Tertiary butyl peroxide | 3.08 (NVP) 2.80 (VA) | 4.70 (NVP) 4.60 (VA) | 0.35 | | | | |
| J | 275 | 23,000 | Diisopropyl peroxy dicarbonate | 2.94 (NVP) 2.66 (VA) | 5.90 (NVP) 5.00 (VA) | 0.99 | .9432 | 97.0 | | |
| K | 275 | 23,000 | do | 7.96 (NVP) 7.19 (VA) | 13.70 (NVP) 9.10 (VA) | 0.43 | .9736 | | | |

Following are data obtained by a more detailed study of Resin B and Resin F of the above table:

| | Resin F | Resin B |
|---|---|---|
| Melt Index (g./min.) | 3.08 | 11.85 |
| Tensile Properties | | |
| Yield Tensile (p.s.i.) | 1870 | 1620 |
| Tensile at Break (p.s.i.) | 1450 | 1270 |
| Elongation at Break (percent) | 325 | 360 |
| Hardness Properties | | |
| Stiffness (p.s.i.) | 30,200 | 23,200 |
| Bullet Impact (ft.lb.) | 37.7 | 25.1 |
| Shore D Hardness | 57.7 | 55.3 |
| Low Temp. Brittleness (failures in 10 samples at −75 C.) | 0 | 7 |
| Electrical Properties | | |
| Dissipation Factor | 0.0263 | 2.761 |
| Dielectric Constant | 0.0145 | 2.468 |
| Optical Properties | | |
| Haze (cast) | | 1.9 |
| Gloss (cast) | | 121.1 |
| Scattermaster Value | | 65.7 |
| Permeability Properties | | |
| Oxygen | $1.38 \times 10^{-3}$ | $2.20 \times 10^{-3}$ |
| Carbon dioxide | $4.34 \times 10^{-3}$ | $5.40 \times 10^{-3}$ |
| Water | 0.46 | 0.13 |
| Hexane | 61.7 | 133.9 |
| Methanol | 1.97 | 1.29 |
| Ethyl Acetate | 44.3 | 53.6 |
| Impurities | | |
| Residual vinyl pyrrolidinone Monomer Content (wt. percent) | | 0.033 |

Resin B was separated into various molecular weight fractions and 1-vinyl-2-pyrrolidinone content of each fraction was measured as an indication of uniformity of the copolymer. Data are tabulated below:

| Fraction [1] | MW×10⁻³ | Vinyl Pyrrolidinone Content (wt. percent) |
|---|---|---|
| D | 5.9 | 2.10 |
| E | 8.6 | 2.10 |
| F | 11.8 | 2.15 |
| G | 16.4 | 2.10 |
| H | 21.8 | 2.10 |
| I | 28.7 | 2.25 |
| J | 43.5 | 2.25 |
| K | 62.0 | 2.1 |
| L | 122.0 | 2.0 |
| M | 300.0 | 2.1 |
| Whole Polymer | 34.0 | 2.1 |

(1) Fraction method: Francis P. S., Cooke, R. C., Jr. and Elliott, J. H., *J. Polymer Sci.* 31, 453 (1958).

Infrared absorption spectra of Resin F and Resin B are shown in the drawing. Both resins are easily converted into transparent films.

B. MANUFACTURE OF DYED THERMOPLASTIC RESINS

Although the interpolymers or terpolymers can be dyed and used alone, or first blended with conventional polyolefin resins to form a substantially homogeneous mixture which can thereafter be dyed, the preferred technique is to first dye the interpolymer and thereafter mix the dyed interpolymer with conventional polyolefins either as a homogeneous mixture by compounding or banburying or as a dry blend of discrete solid pellets, which mixture or blend can then be extruded or molded to produce uniformly colored compositions.

Still yet another technique is to first form the objects from the interpolymer of blends of the interpolymer and polyolefins and subsequently expose these objects, such as film or molded items, to the dye bath for surface dyeing.

EXAMPLE II

An interpolymer of 12.0 melt index, 0.9261 density, 91.5° C. vicat softening temperature and containing 2.06 percent by weight (or 0.67 mol percent) of 1-vinyl-2-pyrrolidinone (Resin B) was continuously extruded into ⅜-inch diameter strands at 15 lb./hr. rate into a water-dye bath maintained at 180° F. and containing 0.3 percent by weight of dye (CI Disperse Yellow 3) A retention time of the strands in the dye bath was varied from 1½ to 3 minutes producing dyed strands which were then dried in air, cut into cylindrical pellets and subsequently molded into test trays at temperatures from 400° to 600° F. The trays were a uniform yellow color.

This procedure was repeated with CI Disperse Red 15 and CI Disperse Blue 3 with equally good results.

EXAMPLE III

An interpolymer of 3.0 MI, density of 0.9379, vicat softening point of 100.5° C. and containing 5.3 weight percent 1- vinyl-2-pyrrolidinone (1.4 mol percent) was first dry mixed 50 percent by weight with a conventional low density polyethylene and subsequently extruded by a compounding extruder into ⅜-inch strands and dyed as in example II. Molded test trays were produced in a uniform color.

EXAMPLE IV

Five pounds of the interpolymer of example II was immersed, in ⅜-inch cube form, in 24 pounds of water-dye baths containing 0.3 percent by weight dye, and maintained at 100° C. for 10 minutes. The dyed cubes were removed from the bath, rinsed with clear water and dried by heated air. The dyed cubes were then dry mixed with a conventional low density polyethylene in proportions of 5 percent, 10 percent, and 20 percent by weight of the blend and each blend subsequently molded into test trays at 400° F. and 600° F. A dispersion disc was used on the injection nozzle of the molding machine to insure uniform color in the test trays. The trays were evenly colored shades of the original dye color with intensities directly proportional to the amount of dyed interpolymer used in the mix.

A total of 38 different dyes of the disperse class were used with equally good results.

EXAMPLE V

The procedure of example IV was used except high-density linear polyethylene was substituted for low-density polyethylene. The trays were of uniform color.

EXAMPLE VI

The procedure of example IV was repeated except molding grade polypropylene was substituted for low density polyethylene. The trays were of uniform color.

EXAMPLE VII

The procedure of example IV was repeated except the blends were extruded into 6-inch layflat blown film at 250° F. on a 1-inch NFM extruder. The film was optically clear and had a uniform color.

EXAMPLE VIII

The dyeing procedure of example was repeated using CI Disperse Red 15 except dyeing time was varied from 5 minutes to 160 minutes. The dye concentration in the interpolymer was measured by spectrophotometry and found to be
5 min. dyeing time $18.7 \times 10^{-4}$ grams dye per gram interpolymer
10 mins. dyeing time $28.6 \times 10^{-4}$ grams dye per gram interpolymer
20 min. dyeing time $36.1 \times 10^{-4}$ grams dye per gram interpolymer
40 min. dyeing time $46.9 \times 10^{-4}$ grams dye per gram interpolymer
80 min. dyeing time $60.6 \times 10^{-4}$ grams dye per gram interpolymer
160 min. dyeing time $69.1 \times 10^{-4}$ grams dye per gram interpolymer

EXAMPLE IX

The interpolymer of example IV was molded into trays in the natural state and the trays subsequently immersed in the dye bath as described in example IV. The trays were deeply dyed on the surface with degree of penetration of the dye into the body of the specimen depending on the time of immersion.

EXAMPLE X

Interpolymers with viscosities of 0.9 to 1.1 and containing 0.5 to 3.0 percent by weight 1-vinyl-2-pyrrolidinone were extruded into 3–5 mil film on a 1-inch NRM extruder by the chill-casting method. The film was passed through a dye bath containing approximately 0.1 percent dye concentration at 175° F. for a contact period of 85 seconds. The film was rinsed and air dried producing a surface dyed, optically clear film with a uniform color intensity proportional to the amount of 1-vinyl-2-pyrrolidinone in the interpolymer.

All of the disperse dyes tested combine with the interpolymer. Each dye has its own characteristic dyeing rate, heat resistance, ultraviolet stability and bleeding rates. It is therefore necessary to choose dyes carefully, depending on the particular requirement of the formed part.

Resistance of dyed resins to ultraviolet radiation may be improved by use of ultraviolet absorbing compounds of, for example, the hydroxy-substituted benzophenone type in the resin compositions. There may also be incorporated in the compositions conventional antioxidants and stabilizers.

C. PRINTING IMPROVEMENT

EXAMPLE XI

An interpolymer containing 14.0 percent by weight of 1-vinyl-2-pyrrolidinone, a viscosity of 0.43 and a density of 0.9736 was compounded into a film grade low-density polyethylene of melt index 2.0 and density 0.9260 in a ratio of 2.0 weight percent of the interpolymer to 98 percent by weight of polyethylene. The compounded blend was extruded into blown film on a 2½-inch extruder at 325° F. stock temperature with portions of the film remaining untreated while other portions were treated in-line with a corona discharge treater (lapel type) at 75, 100, 130, 140 and 145 volts. A film of the pure polyethylene was also extruded and treated under identical conditions as a control. The percent ink retention of the two films is compared as follows:

|  | Pure Polyethylene | Polyethylene + 2% Interpolymer |
|---|---|---|
| 0 volts | 0 | 0 |
| 75 volts | 0 | 10 |
| 100 volts | 0 | 88 |
| 130 volts | 40 | 99 |
| 140 volts | 85 | 99 |
| 145 volts | 93 |  |

EXAMPLE XII

Three ethylene interpolymers of varying weight percents of 1-vinyl-2pyrrolidinone were extruded into 5-inch chill-cast film along with a polyethylene control. The films were first cleaned by wiping with an acetone-saturated pad and printing ink was then applied. The percent ink retention using the Scotch tape test was determined, as recorded below:

|  | Wt. % 1-vinyl-2-pyrrolidinone | % Ink Retention |
|---|---|---|
| Resin 1 | 0.5 | 80 |
| Resin 2 | 4.6 | 85 |
| Resin 3 | 13.7 | 80 |
| Polyethylene | 0 | 5 |

EXAMPLE XIII

The films of example XII were printed and tested with no prior cleaning treatment with solvent:

|  | Wt. % 1-vinyl-2-pyrrolidinone | % Ink Retention |
|---|---|---|
| Resin 1 | 0.5 | about 40% |
| Resin 2 | 4.6 | about 40% |
| Resin 3 | 13.7 | 85% |
| Polyethylene |  | 0% |

D. AQUEOUS DISPERSIONS OF INTERPOLYMER

EXAMPLE XIV

An interpolymer of ethylene with 14.0 percent by weight of 1-vinyl-2-pyrrolidinone was emulsified in the presence of an emulsifier and solvent in a Manton Gaulin homogenizer by the following recipe:

500 grams interpolymer
120 grams of emulsifier (Dupanol C)
2,000 cc. perchloroethylene
6,000 cc. water The mixture was circulated through the homogenizer valve for 2 hours at 180° C. using a 7,500 p.s.i. pressure drop across the valve.

A polyethylene of 20 melt index and 0.924 density was emulsified under identical conditions and the two emulsions compared:

|  | Polyethylene Emulsion | Interpolymer Emulsion |
|---|---|---|
| % solids for stable emulsion | 19% | 30% |
| Film forming (1) | Crazes | Continuous |
| Pin holes per 16 sq. inches (2) | Too many to count | 7 |
| 60 Film gloss on Durez paper (1) | 51.0 | 65 |
| 60 Film gloss on Karra glass (1) | 40.4 | 40.6 |

1. Film was laid down by soaking a 2 inch 2 inch gauze pad with the emulsion and wiping the surface of the substrate.
2. Pin holes were tested with turpentine-red dye solution on the film and the color checked on paper substrate.

E. INTERPOLYMER—IODINE COMPLEXES

Interpolymers of ethylene with 1-vinyl-2-pyrrolidinone readily add iodine to form complexes. A 0.1 M solution of I in methanol was prepared and copolymer film strips of 2 mil thickness were immersed in the iodine solution for various periods of time. In tests of Resin F and Resin B, it was found that after 1 hour Resin F had gained 41 mg. of iodine per gram of polymer. Resin B had gained about 20 mg. of iodine per gram of polymer. In 0.01 M iodine solution, Resin F picked up only about 19 mg. per gram in 1 hour and in 0.001 M iodine it took up only about 4 mg. per gram. Resin B took up about 8 mg. per gram from 0.01 M iodine and about 2.5 mg. per gram from 0.001 M iodine. The iodine uptake thus appears to be a function of both vinyl pyrrolidinone content of the polymer and concentration of the iodine solution as well as time of immersion.

An interpolymer containing 4.2 percent by weight 1-vinyl-2-pyrrolidinone, a viscosity of 0.77, a density of 0.9342 and a vicat softening point of 88 C. was extruded into chill-cast film of about 2 mils thickness. The film was then immersed in a solution of 3 g. iodine in 300 ml. methanol for 5 minutes, was removed, washed in water and dried. This film was yellow in color.

Two different test procedures were developed to compare experimental films as to their abilities to inhibit the growth or hibited the growth of all four organisms. Vinyl acetate-ethylene copolymer film and methyl acrylate-ethylene copolymer film supported growth of *S. aureus* to a greater extent than the control polyethylene film. None of the films supported growth of *E. coli*.

EXPERIMENTAL DETAILS a. Test Method
Several test methods were tried to determine which technique would provide adequate comparisons and reliable results. Two different tests were finally used:
  1. Inhibition of Growth on Agar Plates
  The test organisms at two dilutions were streaked on agar plates and a portion of each streak was covered with a strip of film. After 24, 48 and 72 hours of incubation the streaks were observed for growth.
  2. Inoculated Film for Microbial Survival
  In order to test the survival of micro-organisms on the test films the following procedure was used:
  a. 1 5 cm. strips of film were cut.
  b. The strips were dipped into a culture dilution that approximated 10 microbes per ml. (distilled water dilution).
  c. Several of the strips were allowed to drain and then dropped into 100 ml. of sterile distilled water. The remaining strips were air-dried at room temperature for 24 hours and then dropped into bottles containing 100 ml. of distilled water.
  d. Immediately after the strips were immersed in the distilled water the bottles were shaken for 3 minutes on a Kahn shaker.
  e. A 1 ml. aliquot of the dilution containing the film strip was inoculated on the surface of a petri plate containing suitable growth agar.
  f. Plates were incubated at 25 or 37 C., depending on the organism.
  g. Surface colonies were counted daily for 8 days.
  h. The number of colonies remaining after 24 hours (air-dried film strips) were compared with the number inoculated (drained strips at 0 time).

b. Results
  1. Inhibition of Growth on Agar Plates
  The results for each film are recorded below (table III). The growth characteristics of *Aspergillus* and *Candida* were such that differentiation between films was difficult and of questionable significance. The results with both bacteria are fairly clear cut.

2. Bacterial Survival
  The results of the survival tests on films are recorded in

TABLE III.—INHIBITION OF MICROBIAL GROWTH ON AGAR BY EXPERIMENTAL FILM STRIPS

| Organism | Growth with polymer film (6 plates/film) | | | |
|---|---|---|---|---|
|  | Polyethylene | 20% methyl acrylate-ethylene copolymer | 14% vinyl acetate-ethylene copolymer | 4.2% vinyl pyrrolidinone-ethylene copolymer-iodine complex |
| Staph aureus ATCC 6538 | ++++ | ++++ | ++++ | + |
| E. coli ATCC 4352 | ++++ | ++++ | ++++ | + |
| Aspergillus niger | ± | ± | + | − |
| Candida albicans | + | ± | + | − | support growth of *Staphylococcus aureus*, *Escherichia coli*, *Aspergillus niger* and *Candida albacans*.

The iodine-treated interpolymer film prepared as described above was the superior film in antimicrobial activity and inhibited table IV. Results with bacteria are again fairly clear cut. The iodine complex of 1-vinyl-2-pyrrolidinone-ethylene copolymer is quite effective in inhibiting growth of all organisms tested.

TABLE IV.—SURVIVAL OF MICROBES ON EXPERIMENTAL FILMS

| Organism and contact time on films | Polyethylene | 20% by weight methyl acrylate-ethylene copolymer | 14% by weight vinyl acetate-ethylene copolymer | 4.2% by weight 1-vinyl-2-pyrrolidinone-ethylene copolymer |
|---|---|---|---|---|
| | | Number of organisms [1] | | |
| *Staph. aureus*: | | | | |
| 0 time | 2,300 | 3,300 | 3,000 | 2,500 |
| 24 hrs | 7 | 450 | 450 | 0 |
| *E. coli*: | | | | |
| 0 time | 350 | 300 | 350 | 150 |
| 24 hrs | 0 | 0 | 0 | 0 |
| *A. niger*: | | | | |
| 0 time | 0 | 0 | 6 | 12 |
| 24 hrs | 0 | 0 | 3 | 0 |
| *C. albicans*: | | | | |
| 0 time | 93 | 90 | 90 | 115 |
| 24 hrs | 1 | 0 | 1 | 0 |

[1] Sum of triplicate determinations.

The iodine complexes of 1-vinyl-2-pyrrolidine-ethylene interpolymers are also readily prepared in the form of aqueous dispersions as in example XIV. These dispersions may be used to form bacteriostatic protective coatings on a variety of substrates such as packaging film, wrapping papers and even walls and floors of hospital rooms.

F. INTERPOLYMER BLENDS

It was observed that blends of nylon with 1-vinyl-2-pyrrolidinone-ethylene interpolymer were more homogeneous in appearance than similar polyethylene-nylon blends. A quantitative evaluation of these blends in regard to tensile strength was therefore undertaken. Fifty-fifty blends of nylon 6 and interpolymer B of table II, together with similar 50—50 blends of nylon 6 and polyethylene, were prepared on the Brabender. The best blending procedure appears to be to first dry blend the components before they are introduced to the Brabender. Mixing was continued for 10 minutes at various temperatures and under both air and nitrogen atmospheres. The samples were then quenched and removed from the Brabender. Tensile specimens were then prepared from the blends by compression molding at 450° F. Results obtained are given below.

TABLE V

Tensile Strength of Nylon Blends

| Blending Conditions | | Tensile Strength (p.s.i.) | |
|---|---|---|---|
| (50—50 Blends) T (°C.) Atmosphere | | 1-vinyl-2-pyrrolidinone Copolymer | Polyethylene |
| 230 air | | 5300 | 1990 |
| 230 nitrogen | | 4620 | 1670 |
| 250 air | | 3300 | 1160 |
| 270 air | | 2510 | 800 |
| 270 nitrogen | | 1880 | 640 |
| Pure Components | | | |
| Pure nylon 6 | 11,000 p.s.i. | | |
| Pure interpolymer | | 1,400 | |
| Pure polyethylene | | | 1,350 |

The results clearly show that interpolymer-nylon blends are about three times as strong as polyethylene-nylon blends prepared under the same conditions. This conclusion was further checked by making duplicate blends of the systems prepared at 230° C. and identical results were obtained. All of the tensile strength determinations are considerably lower than the tensile strength of pure nylon, as would be expected. The increased strength of interpolymer blends over polyethylene blends may possibly result from a greater solubility of interpolymer in nylon than polyethylene in nylon. The interpolymer-nylon blends are very useful as such, or may be blended with other polyolefins.

Higher blending temperatures appear to reduce the tensile strength. Apparently the higher the temperature the more the nylon decomposes and this leads to a loss in tensile strength. The effect of nitrogen on the decomposition is not large and indeed it appears to have the opposite effect to what one might expect, i.e. the tensile strengths of systems prepared under nitrogen are lower than similar systems prepared in air.

Blends of paraffin wax (Gulf Wax 55) and dyed interpolymer B of table II were made. The following dyes, in general, will dye interpolymers without dyeing polyethylene and were, therefore, used to color the blends, as an aid in judging the homogeneity of the products:

Setacyl Violet BR Conc.
Setacyl Red 2B
Setacyl Yellow PGL
Setacyl Red R Conc.
Setacyl Turquoise G Supra
Setacyl Pink 3B
Setacyl Brilliant Green 5G Conc.

The paraffin wax was heated to 150° C. on a hot plate and to this was added the colored interpolymer such that a 10 percent blend of interpolymer in the wax was produced. In each case the result was a homogeneous blend of pleasing uniform pastel color. The interpolymers blend readily with other waxes and with many low-melting thermoplastics to yield compositions of attractive appearance.

What is claimed is:

1. A composition comprising an intimate mixture of nylon and a normally solid interpolymer comprising ethylene and from about 0.1 to about 6.0 mol percent 1-vinyl-2-pyrrolidinone, said interpolymer comprising up to 50 weight percent of said mixture and having a vicat softening point within the range of about 33° C. to 105° C., an inherent viscosity measured in decalin at 130° C. in the range of about 0.3 to about 1.13, a degree of crystallinity within the range of about 8 percent to 90 percent as measured by differential thermal analyses and a density within the range of about 0.919 to 0.974 grams per cubic centimeter as measured by a density gradient column.

2. The composition of claim 1 wherein said nylon comprises nylon 6.

* * * * *